(12) United States Patent
Arai et al.

(10) Patent No.: US 8,300,363 B2
(45) Date of Patent: Oct. 30, 2012

(54) WIRING STRUCTURE OF FLEXURE

(75) Inventors: Hajime Arai, Aikoh-gun (JP); Kiyotaka Fukushima, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/225,193

(22) Filed: Sep. 2, 2011

(65) Prior Publication Data
US 2012/0081815 A1  Apr. 5, 2012

(30) Foreign Application Priority Data

Oct. 1, 2010  (JP) .................................. 2010-223834

(51) Int. Cl.
*G11B 5/60* (2006.01)
(52) U.S. Cl. .................................................. 360/245.8
(58) Field of Classification Search ................. 360/245.8
See application file for complete search history.

(56) References Cited

U.S. PATENT DOCUMENTS

| | | | | |
|---|---|---|---|---|
| 5,717,547 A * | 2/1998 | Young | ............................ | 360/246 |
| 5,737,152 A * | 4/1998 | Balakrishnan | ............. | 360/245.9 |
| 5,796,552 A * | 8/1998 | Akin et al. | ................... | 360/264.2 |
| 5,995,328 A * | 11/1999 | Balakrishnan | ............. | 360/245.9 |
| 6,038,102 A * | 3/2000 | Balakrishnan et al. | .... | 360/264.2 |
| 6,487,047 B1 * | 11/2002 | Balakrishnan | ............. | 360/245.8 |
| 6,735,052 B2 * | 5/2004 | Dunn et al. | ................. | 360/245.9 |
| 7,450,346 B2 * | 11/2008 | Arya et al. | ................... | 360/245.1 |
| 7,518,830 B1 * | 4/2009 | Panchal et al. | ............. | 360/245.8 |
| 7,923,644 B2 * | 4/2011 | Ishii et al. | ...................... | 174/254 |
| 7,957,100 B1 * | 6/2011 | Schreiber | .................... | 360/245.3 |
| 7,986,495 B2 * | 7/2011 | Kamei et al. | .................. | 360/246 |
| 8,064,168 B1 * | 11/2011 | Zhang et al. | ................. | 360/245.4 |
| 8,085,506 B1 * | 12/2011 | Ee et al. | ....................... | 360/245.8 |
| 8,102,628 B2 * | 1/2012 | Ota et al. | .................... | 360/245.9 |
| 8,111,483 B2 * | 2/2012 | Arai | ............................. | 360/245.9 |
| 2011/0019311 A1 * | 1/2011 | Greminger et al. | ......... | 360/234.5 |

FOREIGN PATENT DOCUMENTS

JP  10-124837  5/1998

* cited by examiner

*Primary Examiner* — Mark Blouin
(74) *Attorney, Agent, or Firm* — Jordan and Hamburg LLP

(57) ABSTRACT

A wiring structure of a flexure includes wiring that includes a trace of first polarity and a trace of second polarity and transmits signals to and from a head that is supported with the flexure and writes and reads data to and from a recording medium and an interleaved section formed at least partly in the wiring where the traces are each divided into sub-traces, the sub-traces being alternated in a width direction of the wiring, the sub-traces of each trace being connected to each other on each side of the interleaved section, an outer one of the sub-traces of each trace being narrower than an inner one of the same. The wiring structure reduces partial dips in the frequency characteristic of signal transmission loss (loss-to-frequency characteristic) of the wiring at the interleaved section.

4 Claims, 11 Drawing Sheets

| CIS | Layer thickness [μm] | | | |
|---|---|---|---|---|
| | SST | Base PI | Cu | Cover |
| | 20 | 10 | 15 | 5 |

| | | Outer sub-trace width [μm] | Interval [μm] | Inner sub-trace width [μm] | Interval [μm] | Inner sub-trace width [μm] | Interval [μm] | Outer sub-trace width [μm] | Window width [μm] |
|---|---|---|---|---|---|---|---|---|---|
| Inside 150μm | Example 1A 60% | 90 | 20 | 150 | 20 | 150 | 20 | 90 | 640 |
| | Example 1B 80% | 120 | 20 | 150 | 20 | 150 | 20 | 120 | 700 |
| | Example 1C 40% | 60 | 20 | 150 | 20 | 150 | 20 | 60 | 580 |
| | Example 1D 50% | 75 | 20 | 150 | 20 | 150 | 20 | 75 | 610 |
| | Comparative Example 2 100% | 150 | 20 | 150 | 20 | 150 | 20 | 150 | 760 |
| | Comparative Example 3 120% | 180 | 20 | 150 | 20 | 150 | 20 | 180 | 820 |

GMAX plot for conventional configurations

Fig. 10  GMAX plot for IL configurations, Outer trace width diff.
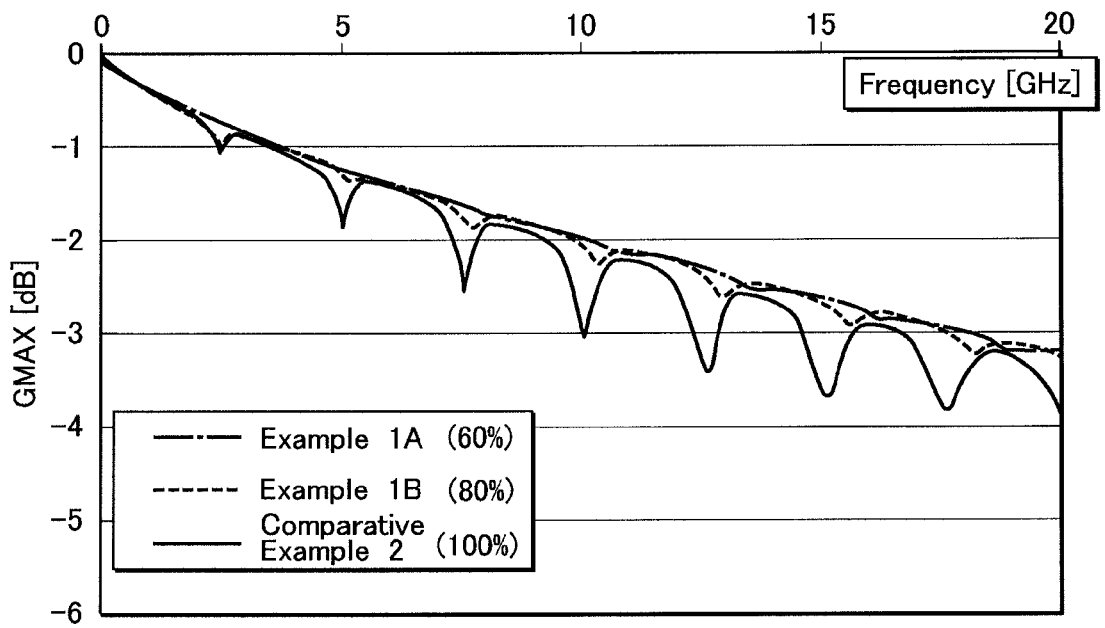
Fig. 11  GMAX plot for Interleaved Trace.
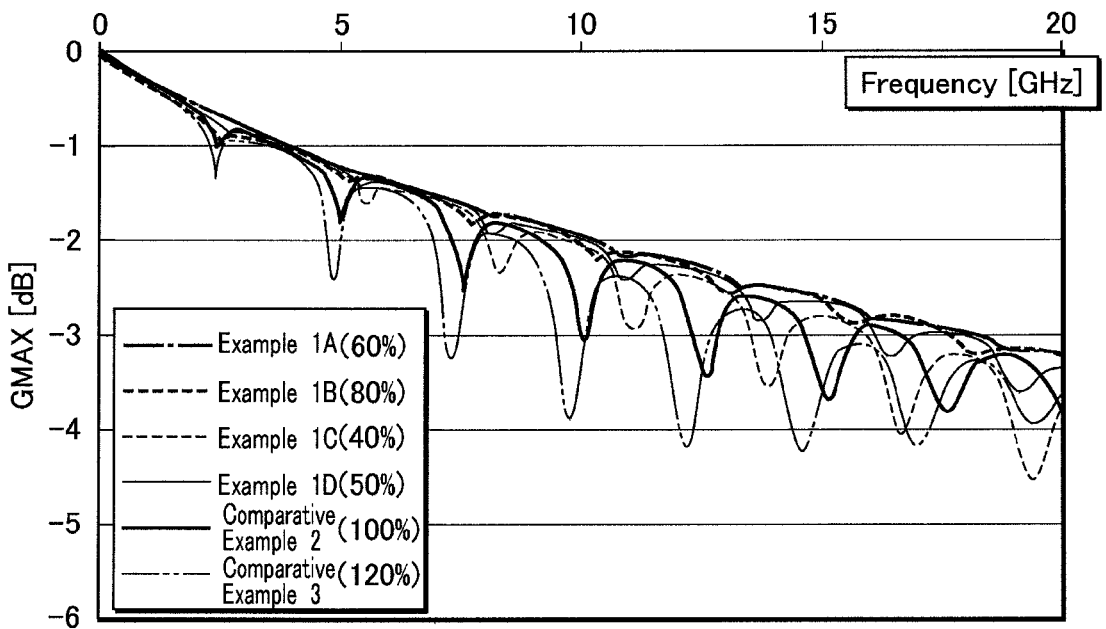

Fig. 19  GMAX plot for IL 6traces configurations
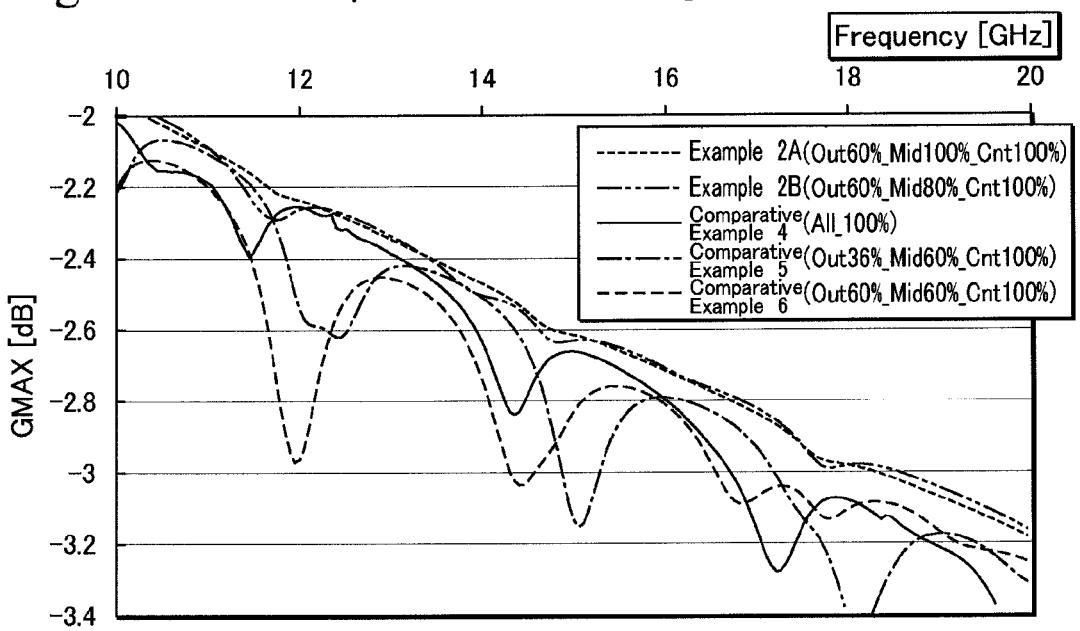
Fig. 20  GMAX plot for IL 6traces configurations
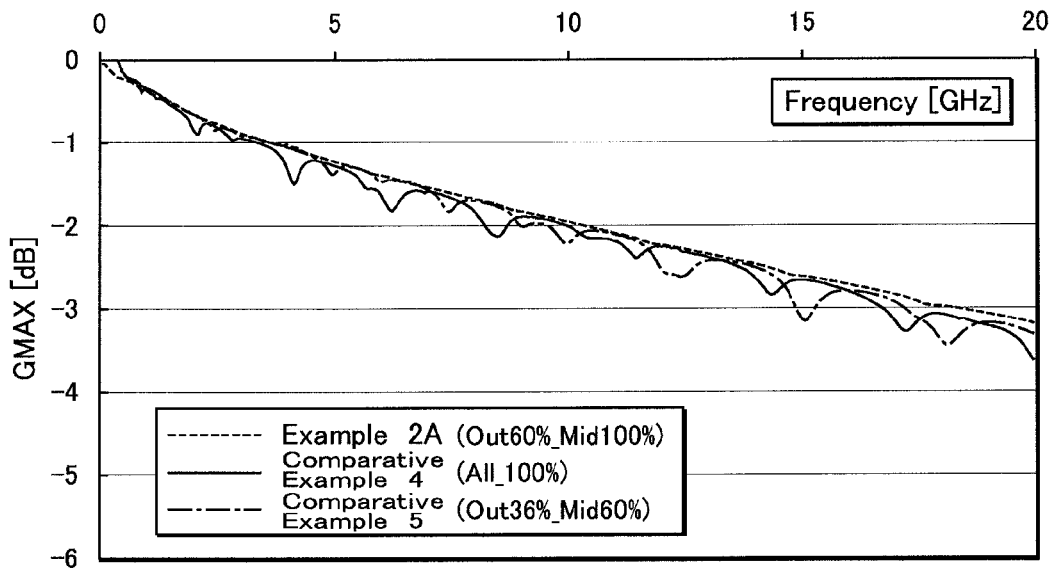

WIRING STRUCTURE OF FLEXURE

BACKGROUND OF THE INVENTION

1. Field of the Invention

The present invention relates to a wiring structure of a flexure attached to a head suspension arranged in, for example, a hard disk drive.

2. Description of Related Art

A hard disk drive incorporates a hard disk and a head suspension that supports a head. The hard disk in the hard disk drive is rotated at high speed and the head of the head suspension slightly floats from the surface of the hard disk, to write and read data to and from the hard disk. The head of the head suspension is attached to a flexure that is fitted to and extending along the head suspension. The flexure includes wiring for transmitting write and read signals to and from the head.

Recent hard disk drives are required to have increased capacity, high transfer speed, and reduced power consumption. To meet the requirements, the wiring of the flexure in the hard disk drive is required to improve electric characteristics, such as reducing impedance and inductance, realizing impedance matching with a preamplifier, and preventing attenuation.

To meet the requirements for the wiring of the flexure, Japanese Unexamined Patent Application Publication No. H10-24837 discloses an interleaved wiring technique of alternating a plurality of traces of both polarities in a width direction of the flexure. This technique is capable of reducing the impedance and the like of the wiring of the flexure.

The interleaved wiring, however, causes partial dips or drops in the frequency characteristic of signal transmission loss (hereinafter sometimes referred to as "loss-to-frequency characteristic") of the wiring, which is not observed in standard wiring employing no interleaved wiring technique. If occur, the partial dips in the loss-to-frequency characteristic cause problems such as creating an unwanted filter and narrowing a bandwidth.

SUMMARY OF THE INVENTION

An object of the present invention is to provide a wiring structure of a flexure, having an interleaved configuration capable of causing no partial dips in the loss-to-frequency characteristic of wiring at an interleaved part.

In order to accomplish the object, an aspect of the present invention provides a wiring structure of a flexure supporting a head to write and read data to and from a recording medium. The wiring structure has wiring including a trace of first polarity and a trace of second polarity and transmitting signals to and from the head and an interleaved section formed at least partly in the wiring where the traces are each divided into sub-traces, the sub-traces being alternated in a width direction of the wiring, the sub-traces of each trace being connected to each other on each side of the interleaved section, an outer one of the sub-traces of each trace being narrower than an inner one of the same.

This aspect of the present invention is capable of preventing partial dips from occurring in the frequency characteristic of signal transmission loss of the wiring of the flexure at the interleaved section.

BRIEF DESCRIPTION OF THE DRAWINGS

FIG. 10 is a partial enlarged view of FIG. 9;

FIG. 11 is a graph illustrating loss-to-frequency characteristics of Examples 1A to 1D and Comparative Examples 2 and 3 provided with outer sub-traces of different widths, respectively;

FIG. 19 is a partial enlarged view of FIG. 18; and

FIG. 20 is a graph illustrating loss-to-frequency characteristics of Example 2A and Comparative Examples 4 and 5.

DETAILED DESCRIPTION OF EMBODIMENTS

Embodiments of the present invention will be explained in detail with reference to the drawings. Each embodiment prevents partial dips from occurring in a frequency characteristic of signal transmission loss at an interleaved section of a wiring structure of a flexure by reducing the width of an outer sub-trace narrower than the width of an inner sub-trace.

Figure 1:
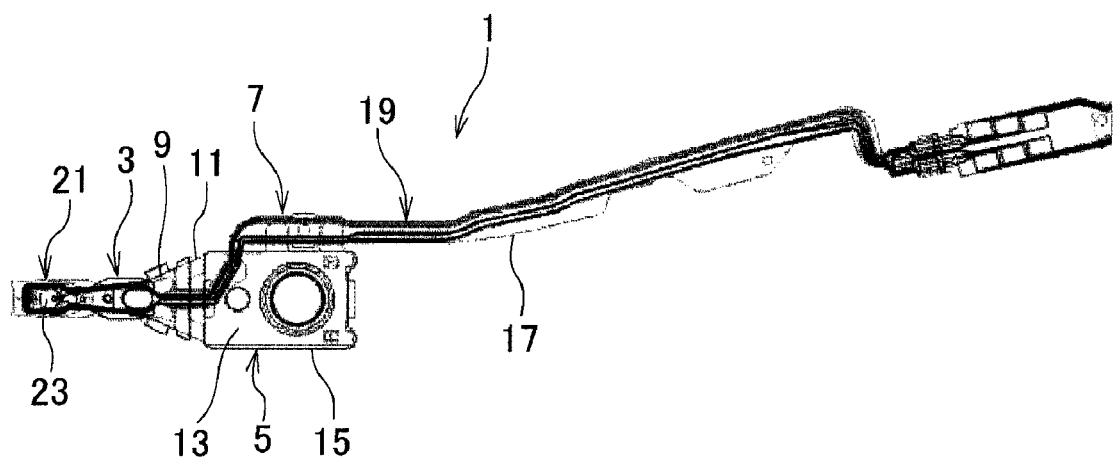
FIG. 1 is a plan view illustrating an example of a head suspension employing a flexure that adopts a wiring structure according to a first embodiment of the present invention.

FIG. 1 is a plan view illustrating a head suspension employing a flexure that adopts a wiring structure according to the first embodiment of the present invention.

In FIG. 1, the head suspension 1 includes a load beam 3, a base 5, and the flexure 7.

The load beam 3 applies load onto a head 21 and includes a rigid part 9 and a resilient part 11. The rigid part 9 is made of, for example, stainless steel and has a thickness of about, for example, 100 μm.

The resilient part 11 is formed separately from the rigid part 9 and is made of, for example, a resilient thin stainless steel rolled plate having a precise spring constant that is lower than that of the rigid part 9. The resilient part 11 has a thickness of about, for example, 40 µm. A first end of the resilient part 11 is fixed to a rear end of the rigid part 9 by, for example, laser welding and a second end thereof is integral with a reinforcing plate 13.

The reinforcing plate 13 is laid on and fixed to a base plate 15, to form the base 5. The base 5 is attached to an arm of a carriage (not illustrated) that is turned around a spindle (not illustrated), to turn the head suspension 1.

The flexure 7 includes a metal substrate 17 and a wiring pattern 19 formed on the metal substrate 17. The wiring pattern 19 includes a write wiring and a read wiring as signal transmission wirings transmitting signals to and from the head 21.

The flexure 7 is fixed to the rigid part 9 by, for example, laser welding. A first end of the wiring pattern 19 is connected to the head 21 and a second end thereof is extended toward the base 5.

The flexure 7 has a tongue 23 that is formed into a cantilever. The tongue 23 supports a slider of the head 21 to write and read data to and from a recording medium. The head 21 includes a write element and a read element. The write element is, for example, a standard inductive magnetic transducer. The read element is, for example, an MR element, a GMR element, or a TuMR element having a high read sensitivity. With respect to the head 21, the wiring pattern 19 transmits write and read signals.

The head 21 may be provided with a heater to finely adjust a gap by thermal expansion with respect to a hard disk and a sensor to detect if the head 21 hits the hard disk. In this case, the wiring pattern 19 further includes a heater wiring and a sensor wiring to transmit heater control signals and sensor detection signals as signal transmission wirings.

Figure 2:
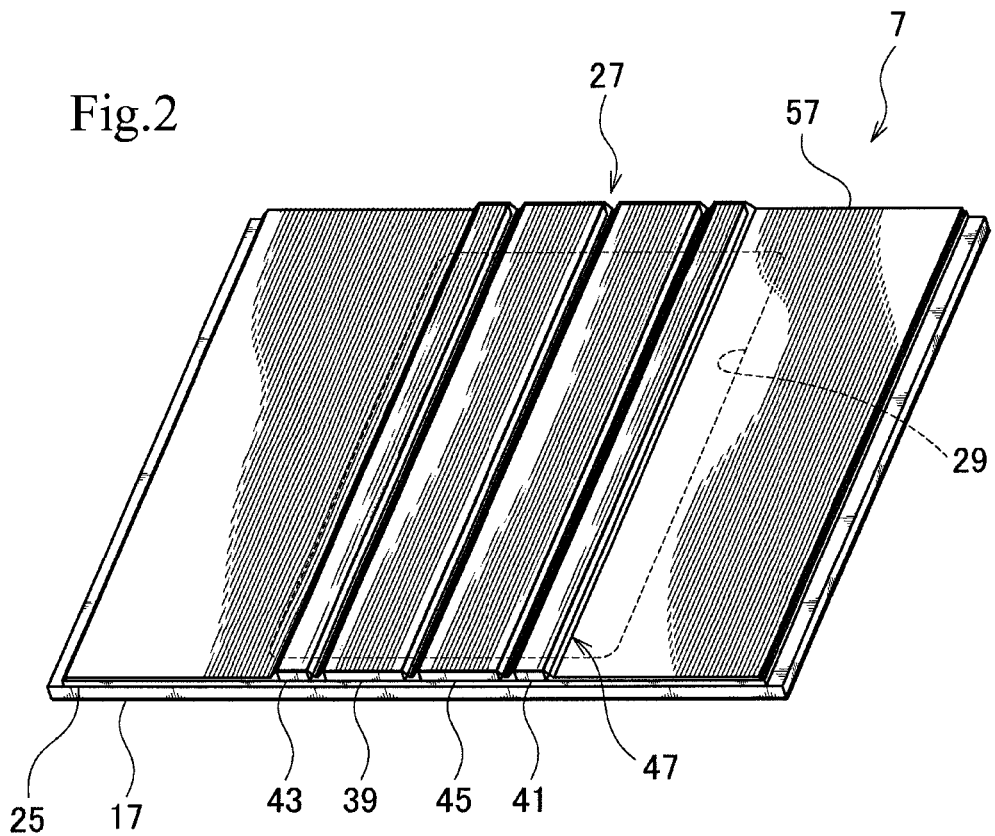
FIG. 2 is a perspective view illustrating a part of the flexure of FIG. 1.
Figure 3:
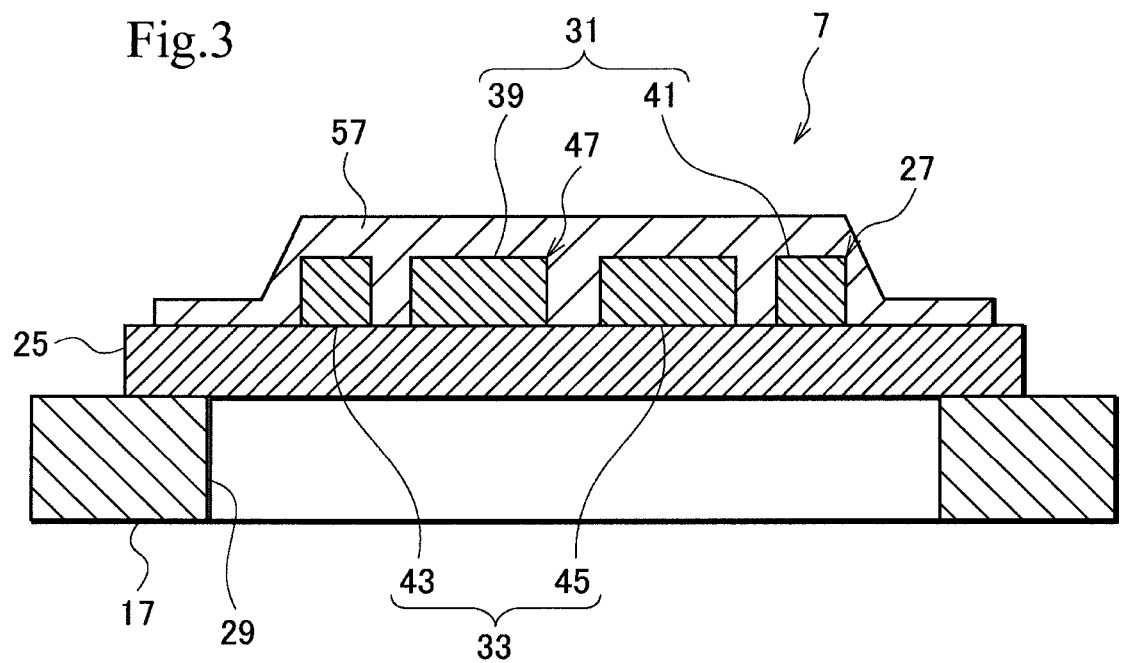
FIG. 3 is a sectional view illustrating the flexure of FIG. 2.
Figures 4, 5A, 5B:
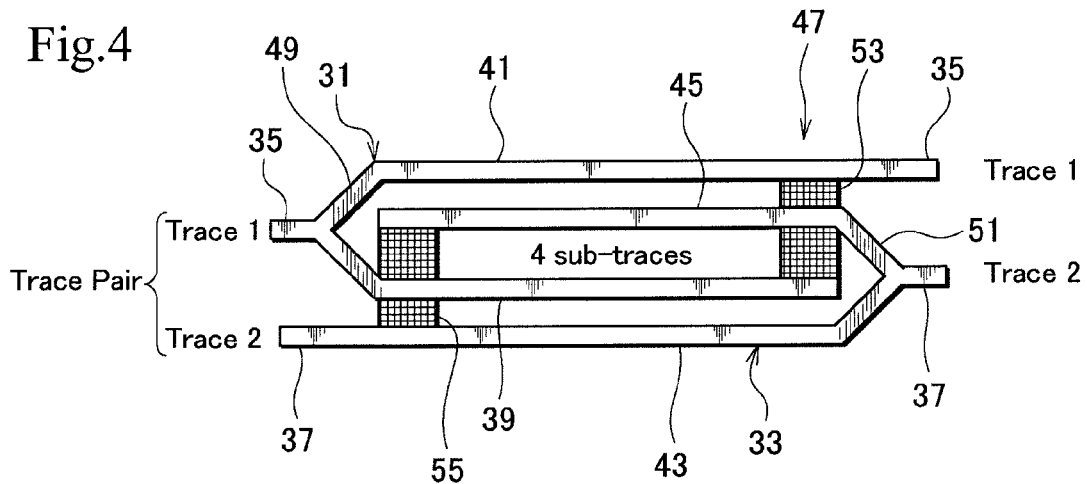
FIG. 4 is a model illustrating an interleaved section of the wiring structure according to the first embodiment.
FIGS. 5A and 5B are tables listing dimensions of analytic models of Examples 1A to 1D according to the first embodiment and Comparative Examples 2 and 3.

FIG. 2 is a perspective view illustrating a part of the flexure 7, FIG. 3 is a sectional view illustrating the flexure 7, and FIG. 4 is a model illustrating an interleaved section of the wiring structure according to the first embodiment.

The wiring structure of the flexure 7 according to the first embodiment is applicable to any of the write wiring, read wiring, heater wiring, and sensor wiring as signal transmission wirings, and therefore, the following explanation is made on an assumption that the wiring structure is applied to one of the write wiring, read wiring, heater wiring, and sensor wiring. Namely, the one of the write, read, heater and sensor wirings to be explained is hereinafter referred to as the "wiring".

As illustrated in FIGS. 2 to 4, the flexure 7 includes the metal substrate 17, a base insulating layer 25 formed on the metal substrate 17, and the wiring 27 formed on the base insulating layer 25.

The metal substrate 17 is made of a conductive thin plate such as a resilient thin stainless rolled plate (SST). The thickness of the metal substrate 17 is in the range of, for example, about 12 to 20 µm, and according to the first embodiment, is about 20 µm. The metal substrate 17 is provided with a through window 29.

The window 29 improves the impedance of the wiring 27, to realize a wide bandwidth. The window 29 is formed at proper locations along the wiring 27 extended along the flexure 7. A tiling ratio of the windows 29 with respect to the wiring 27 is properly adjusted to realize required impedance and bandwidth for the wiring 27.

The base insulating layer 25 is made of flexible insulating resin such as polyimide. The thickness of the base insulating layer 25 is in the range of, for example, about 5 to 15 µm, and according to the first embodiment, is about 10 µm.

The wiring 27 include a first trace 31 (indicated as "trace 1" in FIG. 4) of first polarity and a second trace 33 (indicated as "trace 2" in FIG. 4) of second polarity that are made of conductive metal such as copper. The first and second traces 31 and 33 are in parallel with each other in a width direction of the flexure 7. The thickness of the wiring 27 is in the range of, for example, about 8 to 15 µm, and according to the first embodiment, is about 15 µm.

The first trace 31 includes single trace sections 35 on both sides and a pair of first sub-traces 39 and 41 between the single trace sections 35. The first sub-traces 39 and 41 are in parallel with each other in the width direction of the flexure 7. The second trace 33 includes single trace sections 37 on both sides and a pair of second sub-traces 43 and 45 between the single trace sections 43. The second sub-traces 43 and 45 are in parallel with each other in the width direction of the flexure 7. The first and second sub-traces 39, 41, 43, and 45 form an interleaved section 47 at a part of the wiring 27. The interleaved section 47 may be formed entirely on the wiring 27 or at plural parts of the wiring 27 in a longitudinal direction thereof. Namely, the interleaved section 47 is formed at least partly in the wiring 27 where the traces 31 and 33 are each divided into sub-traces 39, 41, 43 and 45.

In the interleaved section 47, the first and second sub-traces 39, 41, 43, and 45 are alternated on the base insulating layer 25 in the width direction of the flexure 7. Namely, in the interleaved section 47, the sub-traces 39 and 41 of the first trace 31 of first polarity and the sub-traces 43 and 45 of the second trace 33 of second polarity are interleaved or alternated.

In the interleaved section 47, the first and second sub-traces 41 and 43 are each on an outer side of the interleaved section 47 of the wiring 27 and the first and second sub-traces 39 and 45 are each on an inner side of the interleaved section 47 of the wiring 27. The width of each of the outer first and second sub-traces 41 and 43 is narrower than that of a corresponding one of the inner first and second sub-traces 39 and 45.

Width reduction of the outer first and second sub-traces 41 and 43 is carried out so that partial dips in the frequency characteristic of signal transmission loss (loss-to-frequency characteristic) of the wiring 27 at the interleaved section 47 may decrease with respect to a level observed under assumption that all the sub-traces 39, 41, 43, and 45 have the same width at the interleaved section 47.

According to the first embodiment, the inner first and second sub-traces 39 and 45 each have a width of about 120 µm or 150 µm and the outer first and second sub-traces 41 and 43 each have a width in the range of about 50% to 80%, in particular about 60%, of the width of the inner first and second sub-traces 39 and 45.

An interval between adjacent ones of the first and second sub-traces 39, 41, 43, and 45 is the same size, and according to the first embodiment, is about, for example, 20 µm. The intervals defined by the first and second sub-traces 39, 41, 43, and 45 may not be set in the same size. For example, all the intervals may have different sizes or selected one of the intervals may have a different size from the rest.

One ends of the first sub-traces 39 and 41 are connected together through a fork 49 into the single trace section 35 and the other ends of the first sub-traces 39 and 41 are connected together through a bridge 53 into the single trace section 35. One ends of the second sub-traces 43 and 45 are connected together through a fork 51 into the single trace section 37 and the other ends of the second sub-traces 43 and 45 are connected together through a bridge 55 into the single trace section 37. Namely, on each side of the interleaved section 47, the sub-traces 39 and 41 of first polarity are connected to each other and the sub-traces 43 and 45 of second polarity are connected to each other.

The wiring 27 having the above-mentioned configuration is covered with a cover insulating layer 57 that is made of flexible insulating resin such as polyimide. The thickness of the cover insulating layer 57 is in the range of, for example, about 4 to 5 μm, and according to the first embodiment, is about 5 μm. The cover insulating layer 57 covers the surfaces of the wiring 27 and protects it from external force and the like. The cover insulating layer 57 may be omitted to expose the surface of the wiring 27.

Frequency characteristics of signal transmission loss (loss-to-frequency characteristics) of various wiring examples will be explained.

Figure 6:
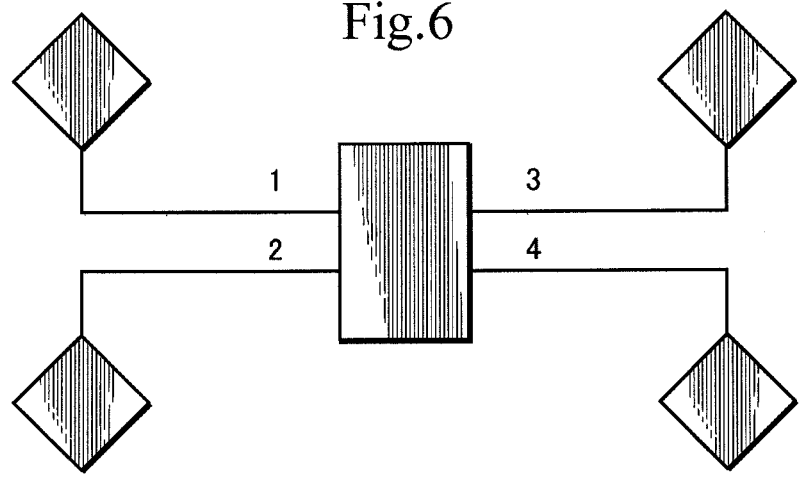
FIG. 6 is a circuit diagram illustrating a frequency characteristic analyzing circuit used to analyze the analytic models of FIGS. 5A and 5B.

FIGS. 5A and 5B are tables listing dimensions of analytic models of Examples 1A to 1D according to the first embodiment and Comparative Examples 2 and 3 and FIG. 6 is a circuit diagram illustrating a frequency characteristic analyzing circuit used to analyze the analytic models of FIGS. 5A and 5B.

As listed in FIG. 5A, each of the analytic models has a metal substrate 17 (SST) of 20 μm thick, a base insulating layer 25 (Base PI) of 10 μm thick, wiring 27 (Cu) of 15 μm thick, and a cover insulating layer 57 (Cover) of 5 μm thick.

As listed in FIG. 5B, the widths of inner first and second sub-traces (39 and 45) are each set to 150 μm (25Ω in impedance (Z0)) and intervals among sub-traces are each set to 20 μm. Outer first and second sub-traces (41 and 43) of the analytic models are provided with different widths of 40%, 50%, 60%, 80%, 100%, and 120% of the inner sub-trace width, respectively. Depending on the different outer sub-trace widths, the metal substrates 17 of the analytic models are provided with windows 29 of different widths of 580 μm, 610 μm, 640 μm, 700 μm, 760 μm, and 820 μm, respectively.

Three-dimensional electromagnetic field analysis software "Ansoft HFSS® "is used to form each three-dimensional model of the wiring 27 and calculate S-Parameters. Resultant data from this software is applied to the circuit of FIG. 6 to carry out circuit calculations with circuit analysis software "Ansoft Designer®".

Figure 7:
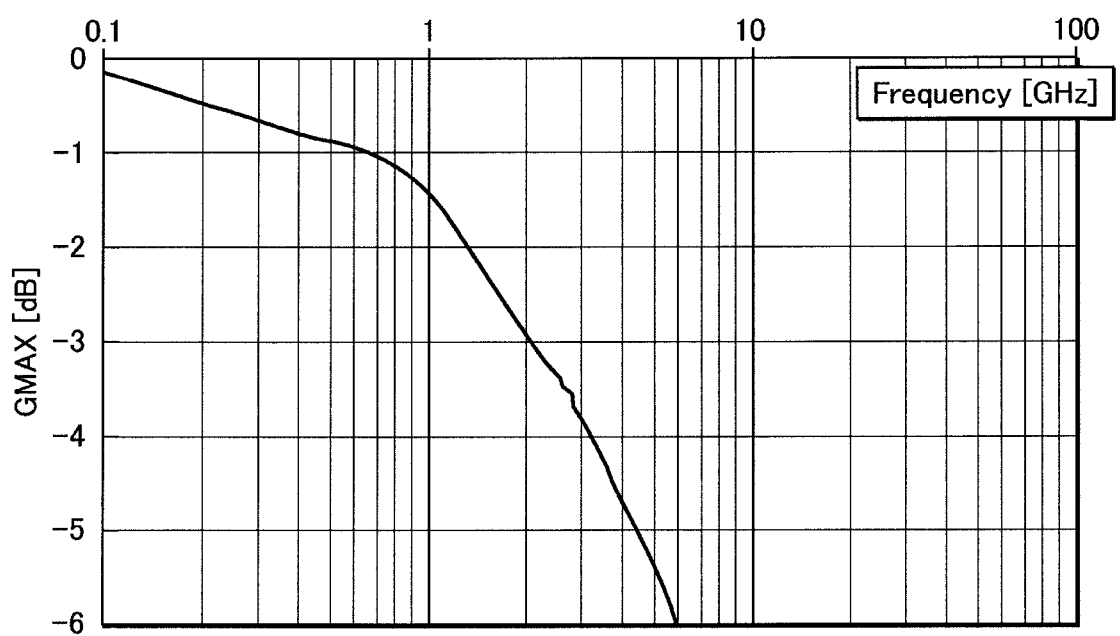
FIG. 7 is a graph illustrating a frequency characteristic of signal transmission loss (loss-to-frequency characteristic) of Comparative Example 1 employing no interleaved section.
Figure 8:
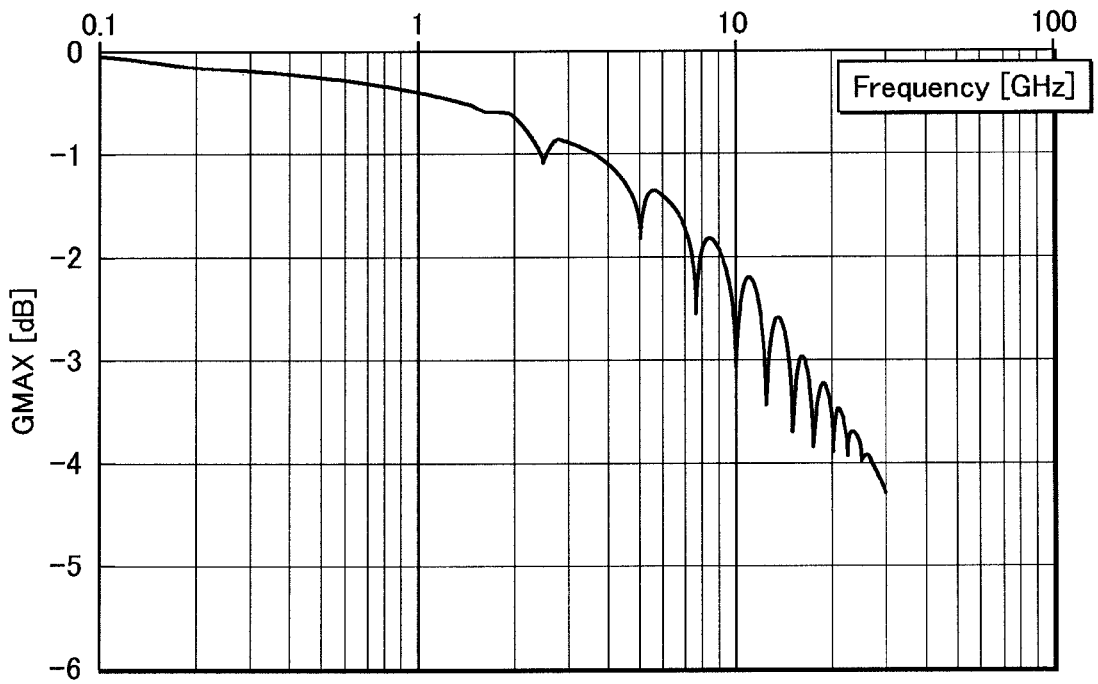
FIG. 8 is a graph illustrating a loss-to-frequency characteristic of Comparative Example 2 employing an interleaved section with sub-traces of the same width.
Figure 9:
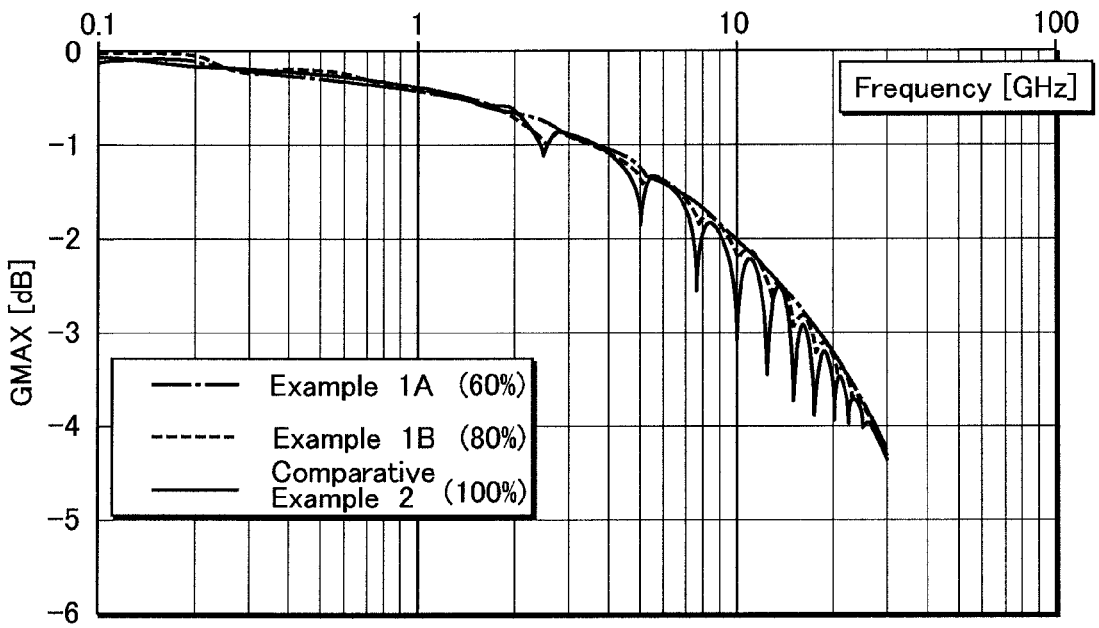
FIG. 9 is a graph illustrating loss-to-frequency characteristics of Examples 1A and 1B and Comparative Example 2 provided with outer sub-traces of different widths, respectively.

FIGS. 7 to 10 are graphs illustrating results of the loss-to-frequency characteristic analyses of the models, in which FIG. 7 is of Comparative Example 1 employing no interleaved section, FIG. 8 is of Comparative Example 2 employing an interleaved section with sub-traces of the same width, FIG. 9 is of Examples 1A and 1B and Comparative Example 2 provided with outer sub-traces of different widths, respectively, and FIG. 10 is a partial enlarged view of FIG. 9. In FIGS. 7 to 10, an ordinate represents gain and an abscissa represents frequency.

According to Comparative Example 1 illustrated in FIG. 7, no partial dip is observed in the loss-to-frequency characteristic because it employs no interleaved section. However, a frequency at a half gain attenuation level of −3 dB is about 2 GHz, to demonstrate a very narrow bandwidth. According to Comparative Example 2 illustrated in FIG. 8, the loss-to-frequency characteristic is generally gentle to demonstrate an expanded bandwidth. However, the frequency at the gain of −3 dB is only about 10 GHz due to dips in the loss-to-frequency characteristic.

On the other hand, Examples 1A (60%) and 1B (80%) according to the first embodiment in FIGS. 9 and 10 make the loss-to-frequency characteristics gentler to expand bandwidths and reduce dips in the loss-to-frequency characteristics. Example 1A (60%) increases the frequency at the gain of −3 dB to about 18 GHz and Example 1B (80%) to about 17 GHz.

FIG. 11 is a graph illustrating the loss-to-frequency characteristics of Examples 1A, 1B, 1C, and 1D according to the first embodiment and Comparative Examples 2 and 3. Examples 1A, 1B, 1C, and 1D employ outer sub-trace widths of 60%, 80%, 40%, and 50% of the inner sub-trace width, respectively. Comparative Examples 2 and 3 employ outer sub-trace widths of 100% and 120% of the inner sub-trace width, respectively.

In FIG. 11, Examples 1C (40%) and 1D (50%) according to the first embodiment demonstrate generally gentle loss-to-frequency curves to expand bandwidths and reduce dips in the loss-to-frequency characteristics. Example 1C (40%) expands the frequency at the gain of −3 dB to about 11 GHz and Example 1D (50%) to about 16 GHz.

On the other hand, Comparative Example 3 (120%) expands an outer sub-trace width wider than an inner sub-trace width, and as a result, deteriorates the frequency at the gain of −3 dB to about 5 GHz.

Figure 12:
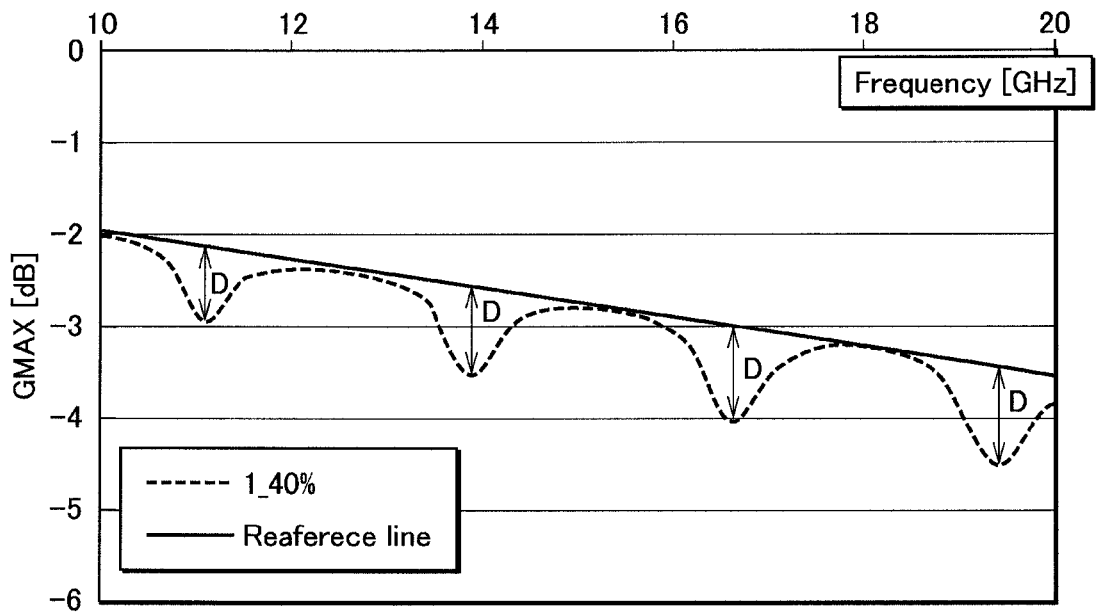
FIG. 12 is a graph explaining partial dips in a loss-to-frequency characteristic.
Figure 13:
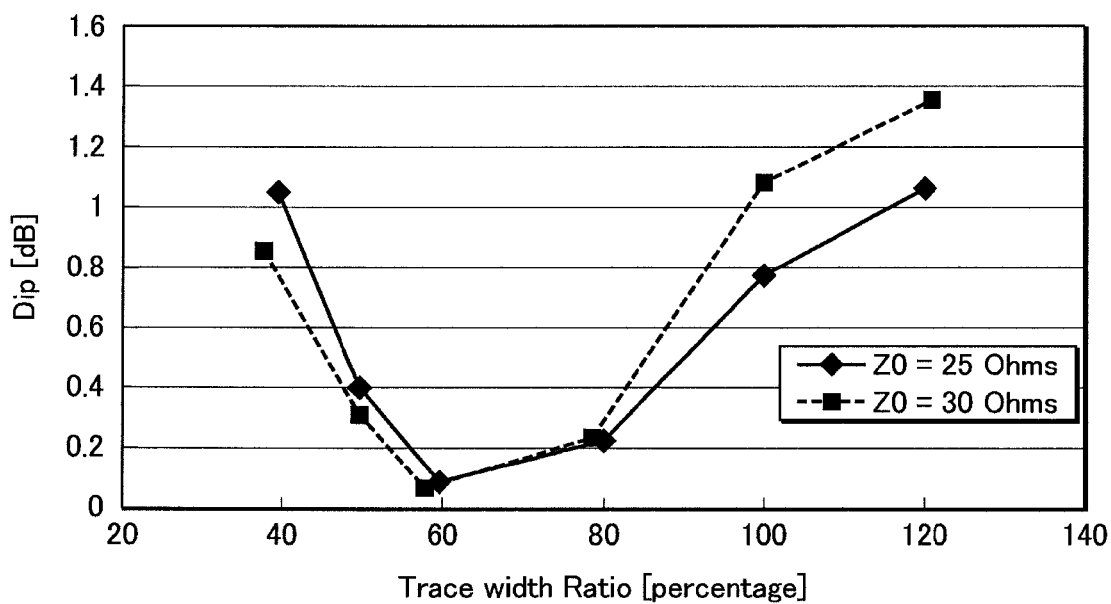
FIG. 13 is a graph illustrating a relationship between partial dips in a loss-to-frequency characteristic and outer sub-trace width.

FIG. 12 is a graph explaining partial dips occurring in a loss-to-frequency characteristic. FIG. 13 is a graph illustrating a relationship between partial dips in a loss-to-frequency characteristic and outer sub-trace width. In FIG. 13, a dotted line is with an inner sub-trace width of 120 μm (impedance (Z0) of 30Ω) and a continuous line is with an inner sub-trace width of 150 μm (impedance (Z0) of 25Ω). In FIG. 13, an ordinate represents dip and an abscissa represents outer sub-trace width.

In FIG. 12, a dip D corresponds to a distance from a reference gain line with no dip and is expressed in units of gains. In FIG. 13, the outer sub-trace width is changed from 40% to 120% of the inner sub-trace width and the dip is measured at each outer sub-trace width.

At each of the inner sub-trace widths of 150 μm (impedance (Z0) of 25Ω) and 120 μm (impedance (Z0) of 30Ω), the dip decreases as the outer sub-trace width decreases from 100% to 60%. When the outer sub-trace width is 60% of the inner sub-trace width, the dip is nearly zero.

As the outer sub-trace width ratio decreases from 60%, the dip increases from nearly zero and finally exceeds the level of the outer sub-trace width ratio of 100%. Also, the dip increases when the outer sub-trace width ratio increases above 100%. These phenomena are observed in both of the different impedance cases of 25Ω and 30 Ω.

It is understood from the analyses that narrowing the outer sub-trace width ratio lower than 100% is effective to decrease dips in the loss-to-frequency characteristics.

As is apparent from FIG. 13, the dip at the outer sub-trace width ratio of 50% to 85% is equal to or less than half the dip at the outer sub-trace width ratio of 100%. When the ratio is 60%, the dip is reduced to nearly zero. Accordingly, the outer sub-trace width ratio is preferable to be within the range of 50% to 85%.

Effect of the first embodiment will be summarized.

The wiring structure according to first embodiment is of the flexure 1 that supports the head 21 to write and read data to and from a recording medium. The wiring structure of the flexure 1 includes the wiring 27 connected to the head 21. At least partly, the wiring 27 is provided with the interleaved section 47 in which the first and second traces 31 and 33 are divided into the first and second sub-traces 39, 41, 43, and 45 that are alternated in a width direction of the wiring 27. On each side of the interleaved section 47, the sub-traces 39 and 41 of first polarity are connected to each other and the sub-traces 43 and 45 of second polarity are connected to each other. The width of each of the outer first and second sub-traces 41 and 43 is narrower than the width of a corresponding one of the inner first and second sub-traces 39 and 45. Width reduction of the outer first and second sub-traces 41 and 43 is carried out so that partial dips in the frequency characteristic of signal transmission loss (loss-to-frequency characteristic) of the wiring 27 at the interleaved section 47 may decrease with respect to a level observed under assumption that all the first and second sub-traces 39, 41, 43, and 45 have the same width at the interleaved section 47.

The wiring structure according to the first embodiment is capable of reducing partial dips in the loss-to-frequency characteristic of the wiring 27 at the interleaved section 47.

Accordingly, the wiring structure of the first embodiment is capable of reducing the impedance and inductance of the wiring 27, realizing an impedance matching with a preamplifier, reducing attenuation, expanding a bandwidth, and preventing the creation of an unwanted filter.

The wiring structure of the first embodiment, therefore, satisfies various electric requirements such as low impedance and an expanded bandwidth for a write wiring.

According to the first embodiment, the width of each of the outer first and second sub-traces 41 and 43 is narrowed to 50% to 85% of the width of a corresponding one of the inner first and second sub-traces 39 and 45. This configuration substantially halves a dip in the loss-to-frequency characteristic of the wiring 27 at the interleaved section 47 compared with a wiring structure employing an interleaved section with every sub-trace having the same width.

The first embodiment may set the width of each of the outer first and second sub-traces 41 and 43 to 60% of the width of the inner first and second sub-traces 39 and 45. This configuration substantially zeroes dips in the loss-to-frequency characteristic of the wiring 27 at the interleaved section 47.

The first embodiment forms the wiring 27 on the base insulating layer 25 that is formed on the metal substrate 17 having the window 29. The window 29 is formed at a position corresponding to the interleaved section 47. Even with this configuration, the first embodiment reduces dips in the loss-to-frequency characteristic of the wiring 27 at the interleaved section 47.

Generally, the window 29 formed in the metal substrate 17 is effective to adjust the impedance and bandwidth of the wiring 27. The window 29, however, tends to cause dips in the loss-to-frequency characteristic of the wiring 27 when the interleaved section 47 is prepared for the wiring 27 at the location of the window 29.

The first embodiment is capable of reducing dips in the loss-to-frequency characteristic of the wiring 27 at the interleaved section 47, and at the same time, allowing the window 29 to adjust the impedance and bandwidth of the wiring 27.

Figure 14:
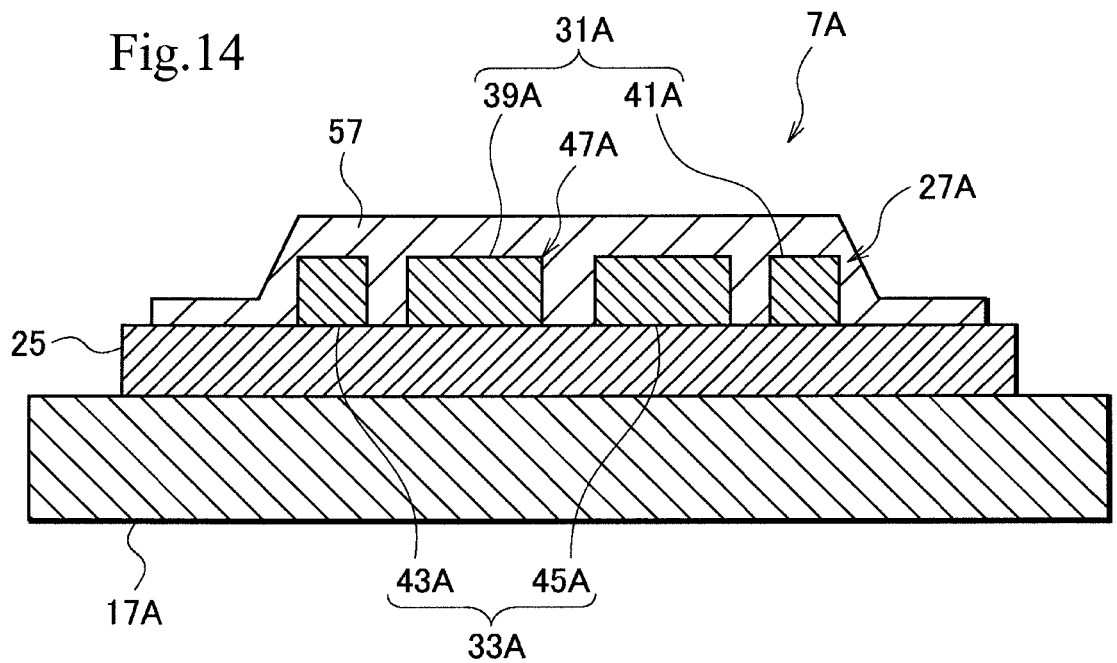
FIG. 14 is a sectional view illustrating a wiring structure of a flexure according to a modification of the first embodiment of the present invention.
Figure 15:
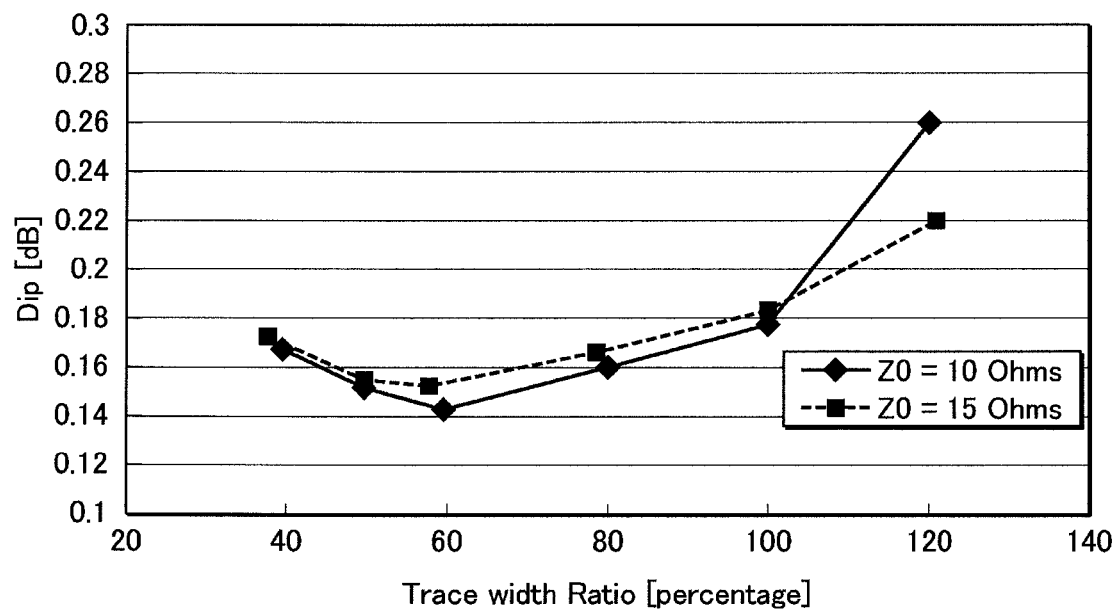
FIG. 15 is a graph illustrating a relationship between partial dips in a loss-to-frequency characteristic and outer sub-trace width according to the modification.

A modification of the first embodiment will be explained. FIG. 14 is a sectional view illustrating a flexure 7A according to the modification and FIG. 15 is a graph illustrating a relationship between partial dips in a loss-to-frequency characteristic and outer sub-trace width according to the modification. The modification is basically the same as the first embodiment, and therefore, corresponding parts are represented with the same reference marks, or the same reference marks plus "A" to omit a repetition of explanation.

The flexure 7A according to the modification has a metal substrate 17A having no window. According to the modification, the impedance (Z0) of wiring 27A is set to 10Ω and 15Ω as illustrated in FIG. 15. The flexure 7A demonstrates a remarkable reduction in dips in the loss-to-frequency characteristic of the wiring 27A at an interleaved section 47A when the outer sub-trace width ratio is in the range of 50% to 85%, and when the ratio is 60%, the dips are minimized.

In this way, the modification provides the same effect as the first embodiment.

Figure 16A:
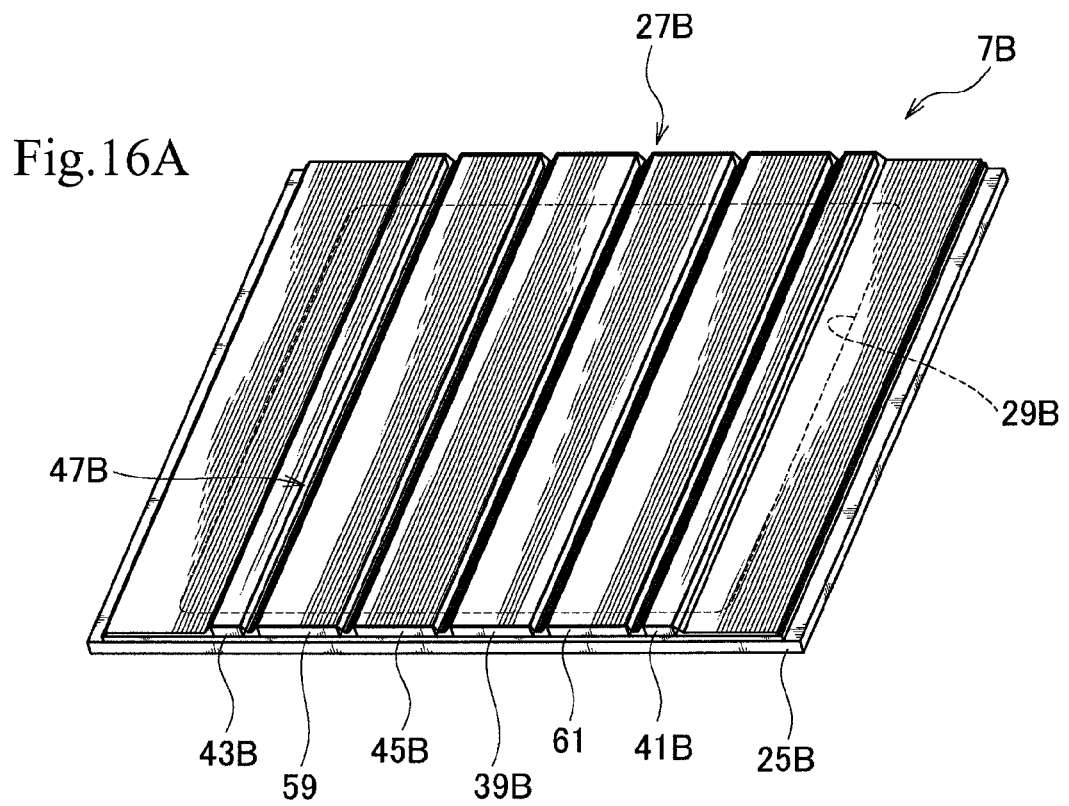
FIGS. 16A and 16B are perspective views illustrating different sub-trace configurations adopted by a wiring structure of a flexure according to a second embodiment of the present invention.
Figure 16B:
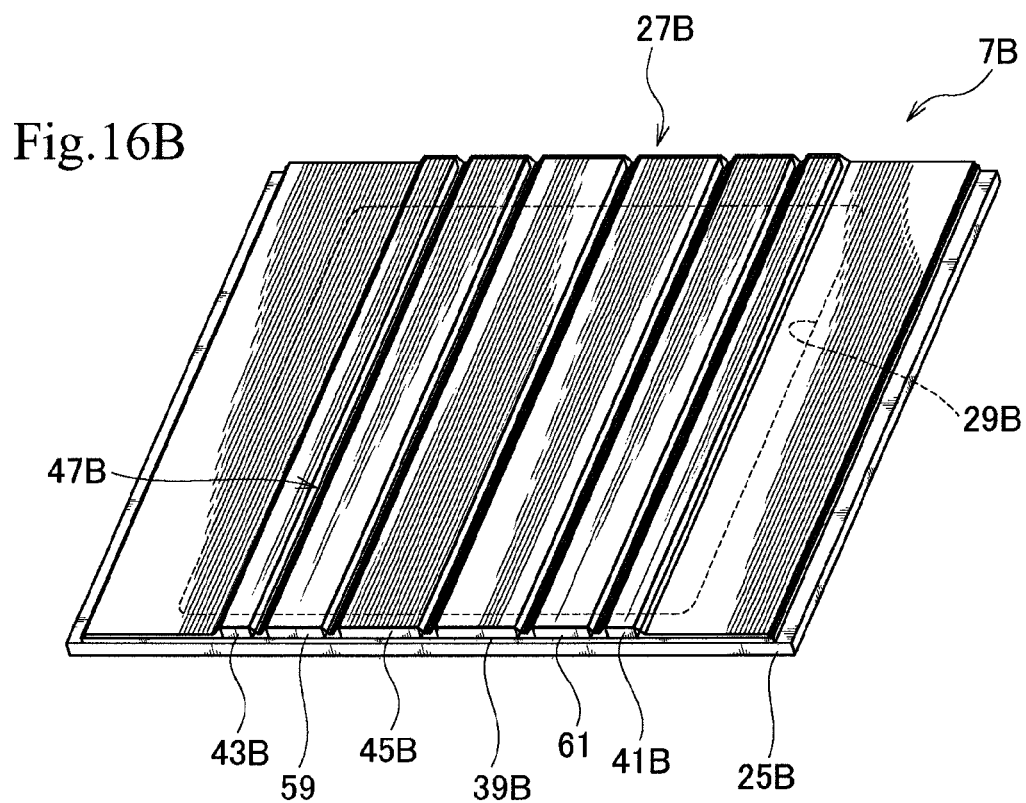
Figure 17:
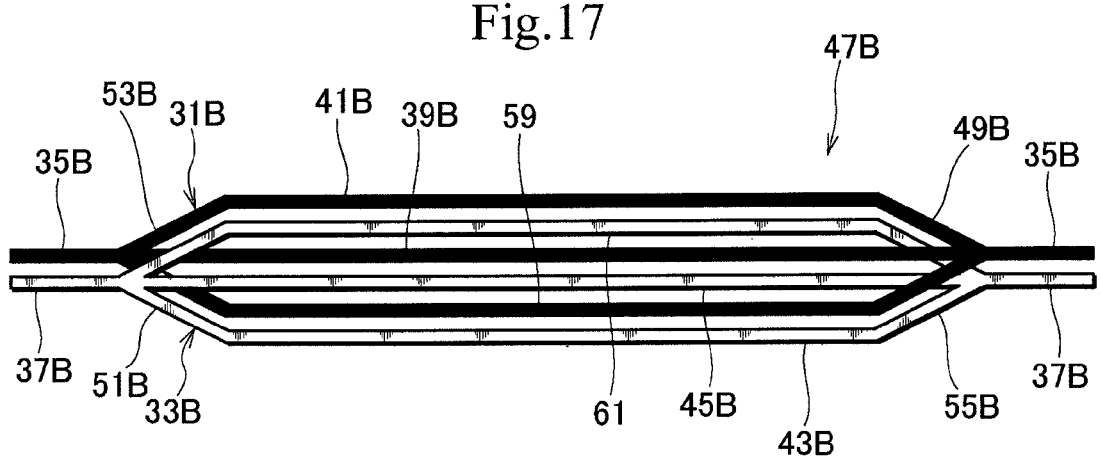
FIG. 17 is a model illustrating the wiring structure according to the second embodiment.

A wiring structure of a second embodiment of the present invention will be explained. FIGS. 16A and 16B are perspective views illustrating different sub-trace configurations adopted by a wiring structure of a flexure according to the second embodiment of the present invention. In FIG. 16A, only an outer sub-trace of each trace is narrower than the other sub-traces of the trace. In FIG. 16B, outer and intermediate sub-traces of each trace are narrower than an inner sub-trace of the trace. FIG. 17 is a model illustrating the wiring structure according to the second embodiment. The second embodiment is basically the same as the first embodiment, and therefore, corresponding parts are represented with the same reference marks, or the same reference marks plus "B" to omit a repetition of explanation.

According to the second embodiment, wiring 27B of the flexure 7B is provided with an interleaved section 47B in which each trace is divided into three sub-traces.

More precisely, a first trace 31B of first polarity includes first sub-traces 59, 39B and 41B between single trace sections 35B. The first sub-traces 59, 3913 and 41B are in parallel with each other in a width direction of the flexure 7B. A second trace 33B of second polarity includes second sub-traces 43B, 45B, and 61 between single trace sections 37B. The second sub-traces 43B, 45B, and 61 are in parallel with each other in the width direction of the flexure 7B.

In the interleaved section 47B, the first and second sub-traces 59, 39B, 41B, 43B, 45B, and 61 are alternated on a base insulating layer 25B in the width direction of the flexure 7B. In the interleaved section 47B, the first and second sub-traces 41B and 43B are each on an outer side of the interleaved section 47B, the first and second sub-traces 59 and 61 are intermediately arranged on inner sides of the sub-traces 41B and 43B, respectively, and the first and second sub-traces 39B and 45B are centrally arranged on inner sides of the sub-traces 59 and 61, respectively.

The width of each of the outer first and second sub-traces 41B and 43B is narrower than that of a corresponding one of the inner first and second sub-traces 39B and 45B.

According to the second embodiment, only the outer first and second sub-traces 41B and 43B may be narrowed as illustrated in FIG. 16A, or the outer first and second sub-traces 41B and 43B and intermediate first and second sub-traces 59 and 61 may be narrowed as illustrated in FIG. 16B.

The frequency characteristics of signal transmission loss (loss-to-frequency characteristics) of the flexure 7B according to the second embodiment will be explained. The width of the outer first and second sub-traces 41B and 43B is changed to 100%, 60%, and 36% of the width of the inner first and second sub-traces 39B and 45B. In addition, the width of the intermediate first and second sub-traces 59 and 61 is changed to 100%, 80%, and 60% of the width of the inner first and second sub-traces 39B and 45B.

Figure 18:
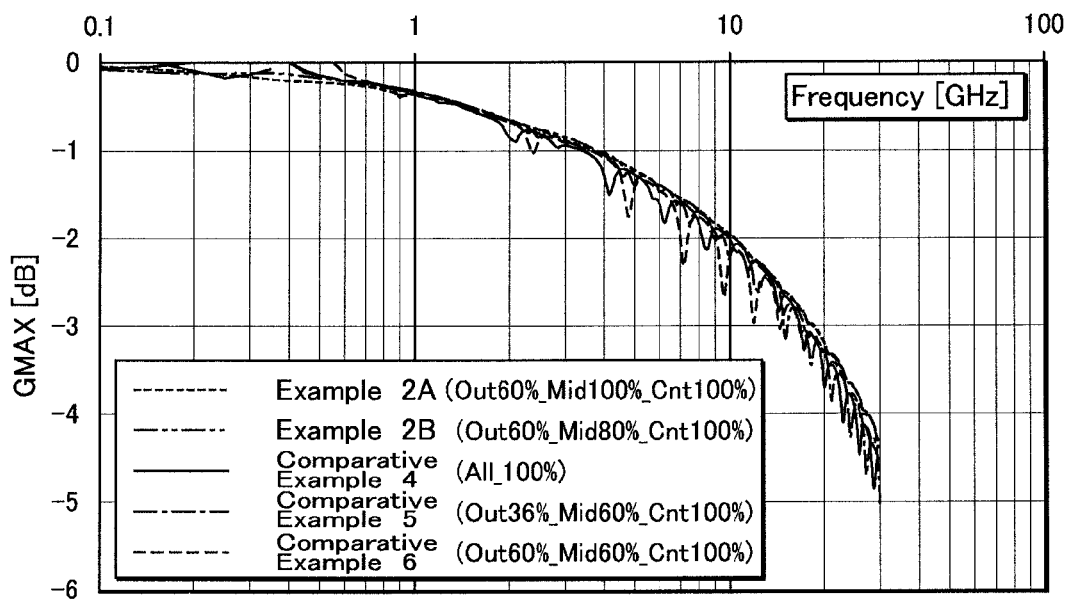
FIG. 18 is a graph illustrating loss-to-frequency characteristics of Examples 2A and 2B according to the second embodiment and Comparative Examples 4 to 6.

FIGS. 18 to 20 are graphs illustrating the loss-to-frequency characteristics of Examples 2A and 2B according to the second embodiment and Comparative Examples 4 to 6. In FIG. 18, Example 2A is with an outer sub-trace width ratio of 60%, Example 2B is with an intermediate sub-trace width ratio of 80% and an outer sub-trace width ratio of 60%, Comparative Example 4 is with every sub-trace having the same width (100%), Comparative Example 5 is with an intermediate sub-trace width ratio of 60% and an outer sub-trace width ratio of 36%, and Comparative Example 6 is with an intermediate sub-trace width ratio of 60% and an outer sub-trace width ratio of 60%. FIG. 19 is a partial enlarged view of FIG. 18 and FIG. 20 is a graph illustrating the loss-to-frequency characteristics of Example 2A and Comparative Examples 4 and 5. In FIGS. 18 to 20, an ordinate represents gain, an abscissa represents frequency, "All" indicates that every sub-trace has the same width, "Out" indicates the width of an outer sub-trace, "Mid" indicates the width of an intermediate sub-trace, and "Cnt" indicates the width of an inner (central) sub-trace.

In FIGS. 18 to 20, a frequency at the gain of −3 dB is about 17 GHz according to Comparative Example 4 employing the same width (100%) for every sub-trace and is about 18 GHz with reduced dips according to Example 2A employing the outer sub-trace width ratio of 60% and Example 2B employing the outer sub-trace width ratio of 60% and intermediate sub-trace width ratio of 80%.

On the other hand, Comparative Example 5 employing the intermediate sub-trace width ratio of 60% and outer sub-trace width ratio of 36% and Comparative Example 6 employing the intermediate sub-trace width ratio of 60% and outer sub-trace width ratio of 60% increase dips and reduce the frequency at the gain of −3 dB to about 15 GHz and 14 GHz, respectively.

The second embodiment that divides each trace into three sub-traces to form the interleaved section 47B is capable of optimizing the loss-to-frequency characteristic of the wiring 27B at the interleaved section 47B when the outer sub-trace width ratio is set to about 60%.

According to the second embodiment, the intermediate sub-trace width ratio may be reduced to about 80% without deteriorating the loss-to-frequency characteristic of the wiring 27B at the interleaved section 47B. However, if the intermediate sub-trace width ratio is reduced to about 60%, the loss-to-frequency characteristic will deteriorate. The loss-to-frequency characteristic will also deteriorate if the width of the outer sub-trace is narrowed relative to the width of the intermediate sub-trace.

Consequently, narrowing only the outer sub-trace relative to the intermediate and inner sub-traces of the same width is effective to reduce dips in the loss-to-frequency characteristic of the wiring 27B at the interleaved section 47B.

The intermediate sub-trace may be narrowed to about 80% of the width of the inner sub-trace without deteriorating the loss-to-frequency characteristic of the wiring 27B at the interleaved section 47B.

In this way, the second embodiment provides the wiring 27B of the flexure 7B with the interleaved section 47B in which each trace is divided into plural sub-traces more than two sub-traces among which the outer first and second sub-traces 41B and 43B are narrower than the inner first and second sub-traces 39B and 45B, thereby providing the same effect as the first embodiment.

The second embodiment may omit a window 29B like the modification of the first embodiment.

As mentioned above, the present invention only has to set an outer one of the sub-traces of each trace of the wiring 27, 27A, and 27B being narrower than an inner one of the same, to decrease partial dips in the frequency characteristic of signal transmission loss (loss-to-frequency characteristic) of the wiring at the interleaved section 47, 47A, and 47B.

Therefore, dimensions of the wiring structure and the flexure 7, impedances of the sub-traces of the wiring 27, 27A, and 27B, the number of the sub-traces and the like are not limited to those of the embodiments and may be changed according to commonly-known flexures.

Furthermore, supporting members of the wiring 27, 27A, and 27B are not limited to the metal substrate and the base insulating layer in order to accomplish the object of the present invention.

What is claimed is:

1. A wiring structure of a flexure supporting a head to write and read data to and from a recording medium, comprising:
    wiring including a trace of first polarity and a trace of second polarity, the traces of the first and second polarities through which signals are transmitted to and from the head;
    an interleaved section formed at least partly in the wiring where the traces are each divided into sub-traces, the sub-traces of one trace of the trace having the first polarity and the trace having the second polarity being alternated in a width direction of the wiring with subtraces of the other of the trace having the first polarity and the trace having the second polarity, the sub-traces of each trace being connected to each other on each side of the interleaved section; and
    an outer one of the sub-traces of each trace being narrower than an inner one of the same.

2. The wiring structure of claim 1, wherein the width of the outer sub-trace is in the range of 50% to 85% of the width of the inner sub-trace.

3. The wiring structure of claim 1, wherein the width of the outer sub-trace is 60% of the width of the inner sub-trace.

4. The wiring structure of claim 1, wherein the wiring structure includes a metal substrate and a base insulating layer formed on the metal substrate, the wiring is formed on the base insulating layer, and the metal substrate is provided with a window at a location corresponding to the interleaved section.

* * * * *